United States Patent [19]

Okuma et al.

[11] Patent Number: 4,811,903
[45] Date of Patent: Mar. 14, 1989

[54] VERY-WIDE-ANGLE NOZZLE UNIT FOR HEADLIGHT CLEANER

[75] Inventors: Shigeki Okuma; Masato Hagiwara, both of Shizuoka, Japan

[73] Assignee: Koito Manufacturing Co., Ltd., Tokyo, Japan

[21] Appl. No.: 89,453

[22] Filed: Aug. 26, 1987

[30] Foreign Application Priority Data

| Aug. 26, 1986 | [JP] | Japan | 61-199368 |
| Aug. 26, 1986 | [JP] | Japan | 61-199371 |
| Aug. 29, 1986 | [JP] | Japan | 61-201317 |
| Aug. 29, 1986 | [JP] | Japan | 61-201318 |

[51] Int. Cl.[4] ............................ B05B 1/10; B60S 1/46
[52] U.S. Cl. ................................. 239/284.2; 239/463; 239/597; 239/601
[58] Field of Search ................... 239/284.1, 284.2, 463, 239/476, 490, 491, 499, 504, 518, 524, 597, 601, 576; 362/61

[56] References Cited

U.S. PATENT DOCUMENTS

| 2,864,652 | 12/1958 | O'Brien et al. | 239/524 X |
| 3,082,961 | 3/1963 | Hruby, Jr. | 239/601 X |
| 3,301,493 | 1/1967 | Frempter | 239/476 X |
| 4,029,259 | 6/1977 | Ursel et al. | 239/284.1 |
| 4,223,841 | 9/1980 | Schaller et al. | 239/601 X |
| 4,248,383 | 2/1981 | Savage et al. | 239/284.1 |
| 4,285,470 | 8/1981 | Roth | 239/284.2 |

FOREIGN PATENT DOCUMENTS

| 2612175 | 10/1977 | Fed. Rep. of Germany . |
| 2710963 | 9/1978 | Fed. Rep. of Germany ... 239/284.2 |
| 378710 | 7/1964 | Switzerland ..................... 239/284.1 |
| 2007088 | 5/1979 | United Kingdom ............. 239/284.2 |
| 2026851 | 2/1980 | United Kingdom ............. 239/284.2 |

Primary Examiner—Andres Kashnikow
Assistant Examiner—Mary Beth O. Jones
Attorney, Agent, or Firm—Sughrue, Mion, Zinn, Macpeak & Seas

[57] ABSTRACT

A very-wide-angle nozzle unit for spraying water on a vehicle head lamp, comprising a short cylindrical member with a water ejection port at a top thereof. The port has curved upper parts and a water outing vane protrudes downwardly into the port. The cylindrical member is supported by a spherical member fitted in a nozzle unit case.

14 Claims, 8 Drawing Sheets

VERY-WIDE-ANGLE NOZZLE UNIT FOR HEADLIGHT CLEANER

BACKGROUND OF THE INVENTION

1. Field of the Invention

The present invention relates to a very-wide-angle nozzle unit for a motor vehicle headlight cleaner which ejects washing water to wash the headlight of a motor vehicle.

2. Background of the Invention

Figure 18A:
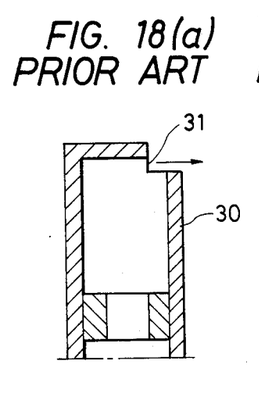
FIGS. 18(a), 18(b) and 18(c) show sectional views of major parts of conventional washing water ejection nozzle units, respectively.
Figure 18B:
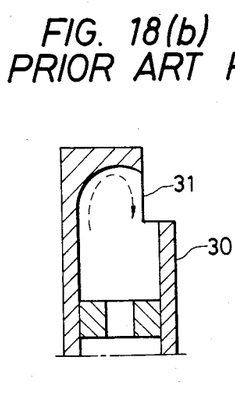
Figure 18C:
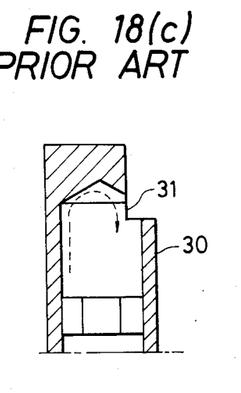

A conventional headlight cleaner made of a washing water ejection nozzle unit 30 as shown in FIGS. 18(a), 18(b) or 18(c) is used to eject high-pressure washing water from the nozzle unit 30 to the face of the headlight of a motor vehicle to wash away mud, insects and the like clinging to the face of the headlight in order to recover the original light projection performance of the headlight.

Recently, the headlight of several types of motor vehicles has become part of the ornamental design of the vehicle. The form of the lens of the headlight of the vehicle of one type has become different from that of the lens of the headlight of the vehicle of another type. Besides, the headlights of many motor vehicles are provided with a small height and a large width in consideration of the appearance of the motor vehicle and its air resistance. As a result, with the above-mentioned conventional washing water ejection nozzle unit 30, the flow of the ejected washing water cannot be made sufficiently turbulent with the nozzle unit 30 of the type shown in FIG. 18(a). An ejective force shown by an arrow in FIGS. 18(b) and 18(c) acts in the illustrated nozzle units in such a direction as to hinder the ejection of the washing water from an ejection port 31 of the nozzle unit of the types shown in FIGS. 18(b) and 18(c). For that reason, the washing water diffusively ejected from the headlight cleaner does not reach the entire face of the headlight and the face of the headlight is not completely all washed. If the face of the headlight is entirely washed, some of the washing water scatters around the headlight to increase the consumption of the washing water and lower the efficiency of the washing. This is a problem.

Figure 19:
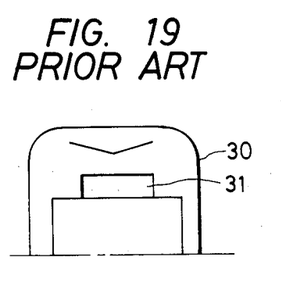
FIG. 19 shows a front view of each of the conventional nozzle units.
Figure 20:
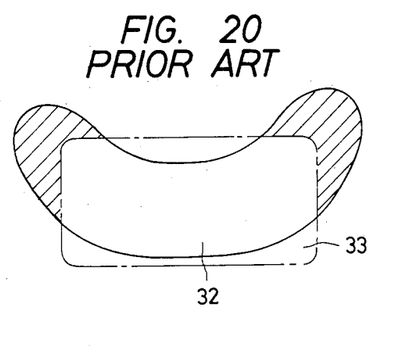
FIG. 20 shows still another ejection pattern.

Since the form of the front of the washing water ejection port 31 of the above-mentioned conventional washing water ejection nozzle unit 30 is nearly oblong as shown in FIG. 19, an ejection pattern 32 shown in FIG. 20 is made when the washing water is ejected to the face of a headlight 33. For that reason, some of the washing water is ineffectively ejected, as shown by hatching in FIG. 20, with regard to the headlight 33 of small height and large width. This is another problem.

A device for attaching the above-mentioned conventional washing water ejection nozzle unit is not provided with an aiming mechanism for appropriately changing the direction of the ejection port of the nozzle unit. Therefore brackets for securing such nozzle units need to be manufactured differently from each other for different types of motor vehicles which differ from each other in the position of the bumper and that of the lens of the headlight. Accordingly, the cost of each of the brackets is increased. This is still another problem.

SUMMARY OF THE INVENTION

The present invention was made in order to solve the above-mentioned problems.

Accordingly, it is an object of the present invention to provide a very-wide-angle nozzle unit for a headlight cleaner, for which the pattern and density of ejection of washing water are controlled to diffuse the ejected washing water at a very wide angle in accordance with the form of the face of a very-wide-angle headlight. High washing power is thereby attained and the washing water in a limited quantity is all effectively utilized to wash the entire face of the headlight.

In the very-wide-angle nozzle unit for the headlight cleaner in which the high-pressure washing water is sprayed at the very-wide-angle headlight of a motor vehicle to recover the original efficiency of projection of light therefrom, a vortical flow generation opening defined at the end of a cylindrical portion and a washing water ejection port opened at the end of the cylindrical portion are provided with special forms to control the high-pressure washing water so that the water ejected in drops from the port is diffused in a prescribed pattern. The vortical flow generation opening is defined by the cylindrical wall of a short cylindrical member, the interior of which communicates with a washing water supply section, and by the uppermost inside surface of the head of the short cylindrical member. A water cutting end which looks curved upward from the center thereof toward both the side portions thereof when being seen straight backward, is provided on the front of the head of the short cylindrical member. A curved end, which looks curved upward from the center thereof toward both the side portions thereof or looks rectilinear when being seen straight backward, is provided on the top of the front half of the short cylindrical member and corresponds to the water cutting end. The washing water ejection port, which is defined by the water cutting end, the curved end and side parts which have an appropriate curvature and which couple the water cutting end and the curved end to each other at both the side portions thereof, is opened into the vortical flow generation opening. A turbulent flow generation part extending down, inside the curved end, by an appropriate height from the uppermost inside surface of the head of the short cylindrical member nearly perpendicularly to the uppermost inside surface is made of the water cutting end.

In the very-wide-angle nozzle unit, the washing water of appreciate high pressure is supplied to the vortical flow generation opening. The upper washing water divided by the water cutting end undergoes multiple rapid vortical flow near the washing water ejection port while gushing out of the port. Since the turbulent flow generation part extending from the uppermost inside surface of the head of the short cylindrical member nearly perpendicularly to the uppermost inside surface is made of the water cutting end, each of the vortical flows divided by the water cutting end collides against the uppermost inside surface and the direction of the vortical flow is forcibly changed so that the flow is converted into a turbulent flow, the center of the vortex of which continuously vibrates. When the washing water has gushed out of the washing water ejection port so that the pressure of the water decreases sharply, the water is changed into drops because of the vortical flows. At that time, the washing water is ejected in a direction restricted by the arc-shaped water cutting end, the curved end and the side parts coupling the water cutting end and the curved end to each other. As a result, the washing water rapidly collides against the face of the headlight so that contaminants clinging to the face are forcibly separated therefrom and washed away.

Since the very-wide-angle nozzle unit is formed so that the water cutting end and the curved end, which defines the washing water ejection port, are curved upward from the center of each of the water cutting end and the curved end toward both the side portions thereof and opposed to each other, the washing water is controlled to be ejected to the entire face of the very-wide-angle headlight of small thickness and large width so as to leave none of the entire face unwashed.

DETAILED DESCRIPTION OF THE PREFERRED EMBODIMENTS

Embodiments of the present invention, which are very-wide-angle nozzle units for headlight cleaners, are hereafter described with reference to the drawings attached hereto.

Figures 1, 2:
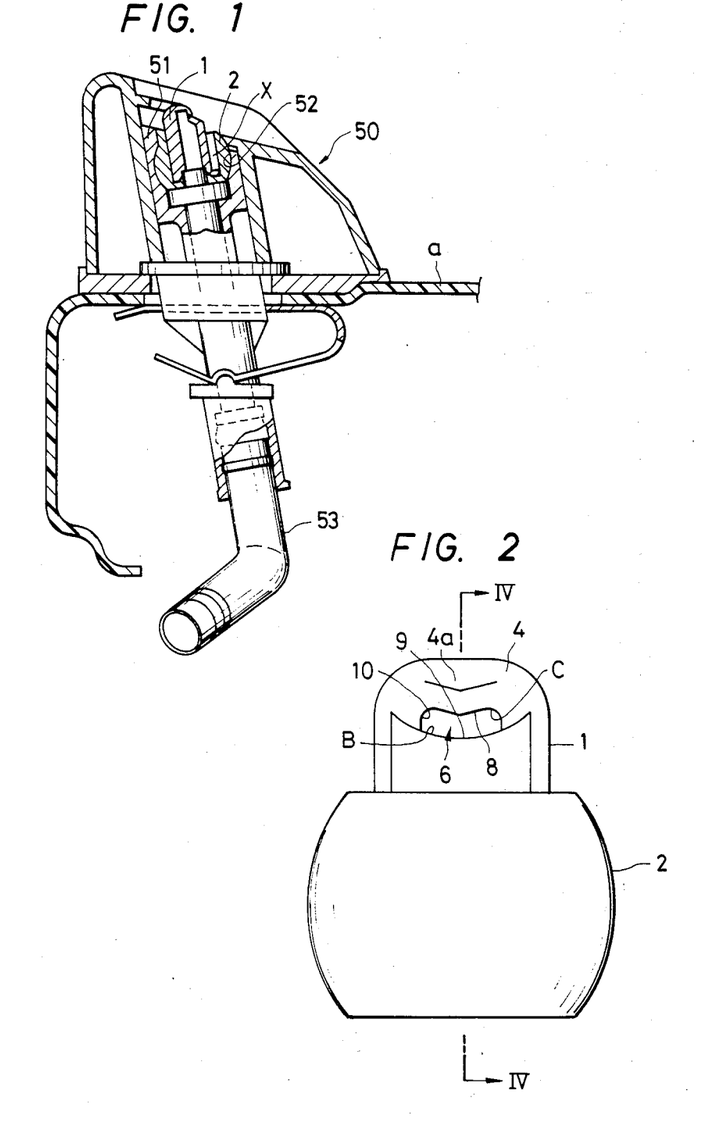
FIG. 1 shows a longitudinally sectional view of a headlight cleaner employing a very-wide-angle washing water ejection nozzle unit which is an embodiment of the present invention.
FIG. 2 shows a front view of the nozzle unit.
Figure 3:
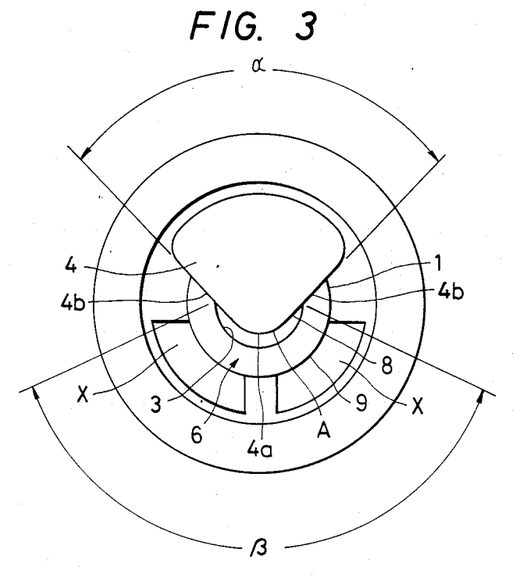
FIG. 3 shows a plan view of the nozzle unit.
Figure 4:
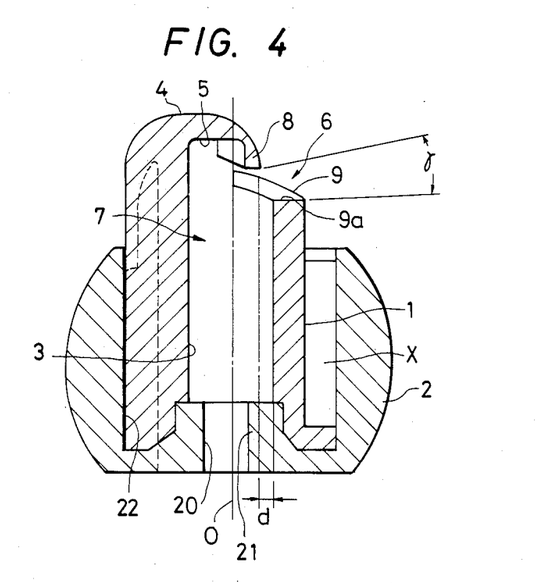
FIG. 4 shows a sectional view along a line IV—IV shown in FIG. 2.
Figure 5:
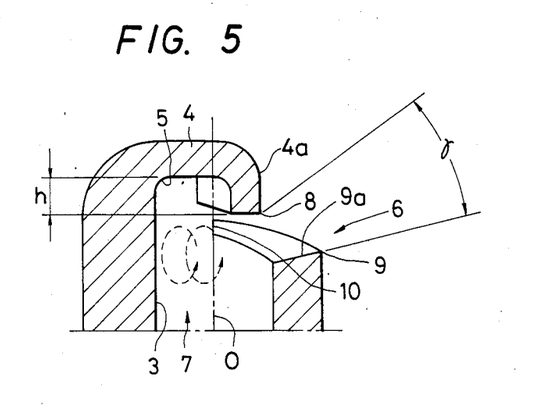
FIG. 5 shows an enlarged view for describing the action of a vortical flow generation opening shown in FIG. 3.

FIGS. 1, 2, 3, 4 and 5 show the first embodiment. FIG. 1 shows a longitudinally sectional view of the headlight cleaner made of the washing water ejection nozzle unit. FIG. 2 shows a front view of the nozzle unit. FIG. 3 shows a plan view of the nozzle unit. FIG. 4 shows a sectional view along a line IV—IV shown in FIG. 2. FIG. 5 shows an enlarged view for describing the action of a vortical flow generation opening shown in FIG. 3.

As shown in the drawings, a spherical member 2 includes a spherical peripheral fitted surface and a short inner cylinder 21 (FIG. 4) having a water passage hole 20 opened at the bottom of the spherical member. The spherical member 2 also includes a recess 22 extending down to the outside circumferential surface of the inner cylinder 21. The spherical member 2 is fitted in a spherical recess 52 provided in the end portion of a nozzle unit case 51 fitted with a conduit 53 through which washing water is supplied. As a result, the secured position of the spherical member 2 can be adjusted and the nozzle unit case 51 and the spherical member 2 function as the constituents of a headlight cleaner 50 which serves to secure the washing water ejection nozzle unit to the bumper a or the like of a motor vehicle.

A short cylindrical member 1 comprises a cylindrical wall 3, the interior of which communicates with the water passage hole 20 of the spherical member 2, and a head 4 formed at the upper end of the cylindrical wall 3. The lower end portion of the cylindrical wall 3 is fitted in the recess 22 of the spherical member 2 so that the outside circumferential surface of the lower end portion of the wall 3 is in contact with that of the recess 22 of the spherical member 2. The inside circumferential surface of the lower end portion of the wall 3 is in contact with the outside circumferential surface of the inner cylinder 21. Shown at X in the drawings is an aiming cavity into which an appropriate jig can be inserted to move the spherical member 2 of the nozzle unit relative to the nozzle unit case 51 to set the direction of ejection of washing water. The short cylindrical member 1 and the spherical member 2 are integrally coupled to each other. Since the spherical member 2 and the short cylindrical member 1 are manufactured separately from each other, a sliding die of high durability can be used to form a washing water ejection port 6. The cylindrical wall 3 and the uppermost inside surface 5 of the head 4 of the short cylindrical member 1 define a vortical flow generation opening 7 into which the washing water ejection port 6 opens at the end portion of the short cylindrical member 1. The diameter of the vortical flow generation opening 7 is larger than that of the water passage hole 20. Since the diameters of the opening 7 and the hole 20 are different from each other, the washing water supplied into the opening 7 produces a state of turbulent flow. A front extremity 4a of the hook-shaped head 4 of the short cylindrical member 1 is located by a small length d behind the front extremity of the inside circumferential surface of the cylindrical wall 3 o the short cylindrical member 1.

The form of the head 4 as viewed vertically seen downward in FIG. 3 is such that side portions 4b of the front of the head 4, which extend from the extremity 4a of the front thereof at an angle u of about 90°, seem to intersect the inside circumferential surface of the cylindrical wall 3 at points thereof at a vertical angle of about 180°. The height h (FIG. 5) of the front of the hook-shaped head 4 gradually decreases from the front extremity 4a of the head toward its side portions 4b so that the front of the head 4 constitutes a turbulent flow generation part made of a water cutting end 8 which looks curved upward from the center thereof toward both the side portions thereof when being viewed straight toward the back. The turbulent flow generation part defines the upper edge of the washing water ejection port 6.

The top of the front half of the short cylindrical member 1 constitutes a curved end 9 which corresponds to the water cutting end 8 and which looks curved upward from the center of the curved end toward both its side portions when being viewed straight toward the back. A surface 9a of the curved end 9 slightly slopes down along the axis of the cylindrical wall 3 so that the angle between the surface 9a and the horizontal plane is about 8°. The curved end 9 and the water cutting end 8 are coupled to each other at both the side portions of the cylindrical wall 3 by side parts 10 of appropriate curvature so as to define the form of the front of the washing water ejection port 6.

Figure 6:
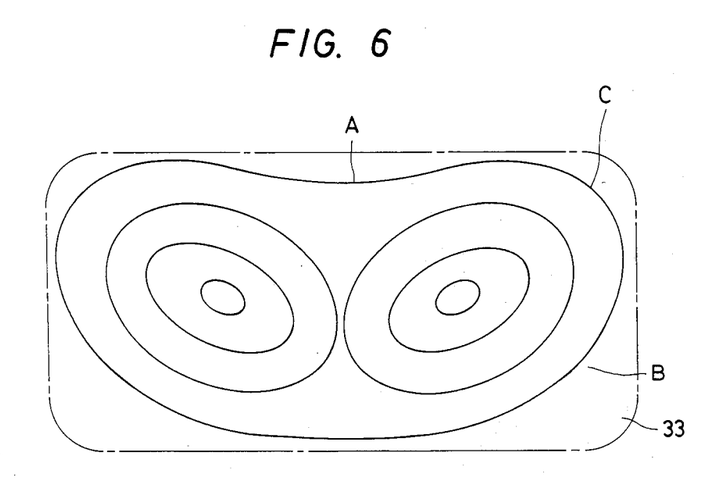
FIG. 6 shows an ejection pattern.

In the very-wide-angle nozzle unit for the headlight cleaner, washing water of appropriate high pressure is supplied to the vortical flow generation opening 7 through the nozzle unit case 51 so that the washing water is ejected in drops from the washing water ejection port 6 at a horizontal diffusion angle $\beta$ of 140° and a vertical diffusion angle $\gamma$ of 21°. Since the water cutting end 8 is located inside the cylindrical wall 3, the upper washing water divided by the water cutting end 8 at the washing water ejection port 6 makes rapid vortical flow patterns, illustrated in FIG. 5, near the washing water ejection port 6. Since the turbulent flow generation part extends nearly vertically downward by the height h from the uppermost inside surface 5 of the head 4 of the short cylindrical member 1, each of the rapid vortical flows divided by the water cutting end 8 collides against the uppermost inside surface 5 so that the direction of the vortical flow is forcibly changed and the flow becomes a turbulent flow, the center of the vortex of which incessantly changes. Because of the turbulent flow, the pressure of the washing water near the washing ejection port 6 pulsates so that when the pressure of the washing water sharply decreases as the water is ejected from the port, the washing water is changed into drops and spouts in a direction range restricted by curves A, B and C (FIGS. 2 and 3) of the arc-shaped water cutting end 8, the curved end 9 and the side parts 10. As a result, an ejection pattern having controlled ejection lines A, B and C, as shown in FIG. 6, corresponding to the curves A, B and C is made when the washing water rapidly collides against the face of a very-wide-angle headlight 33 of small height and large width. At that time, the curve A acts to control the degree of horizontal diffusion of the washing water to prevent the washing water from being excessively-diffused rightward and leftward when being ejected, and also acts to control the uppermost position of the ejected washing water. The curves C act to control the right and left ends of the diffusion of the washing water.

In the first embodiment which is the very-wide-angle washing water ejection nozzle unit for the headlight cleaner, the turbulent flow generation part extends nearly vertically downward, inside the curved end 9, by the appropriate height h from the uppermost inside surface 5 of the head 4 located over the vortical flow generation opening 7. This turbulent flow generation part is made of the water cutting end 8 at the washing water ejection port 6 so that the washing water can be changed into the drops. Since the water cutting end 8 and the curved end 9 which define the washing water ejection port 6 are symmetrically curved upward from the center of each of the ends 8 and 9 toward both the side portions thereof, the washing water is prevented from being ejected outside the lens of the face of the headlight and is ejected to the entire face of the very-wide-angle headlight of small height and large width so that none of the face of the headlight is left unwashed.

Figure 7:
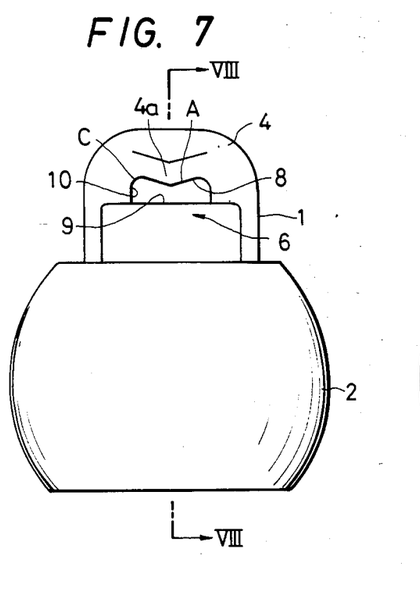
FIG. 7 shows a front view of a very-wide-angle washing water ejection nozzle unit which is another embodiment of the present invention.
Figure 8:
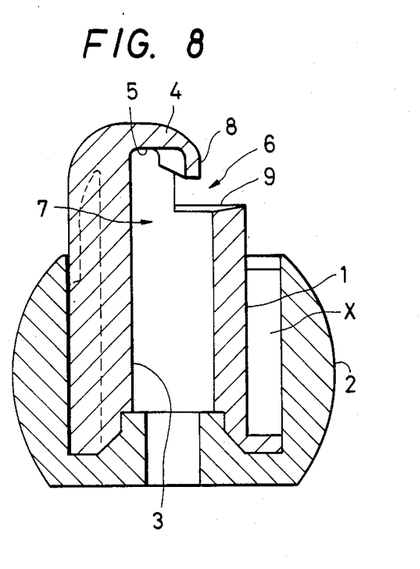
FIG. 8 shows a sectional view along a line VII—VII shown in FIG. 7.
Figure 9:
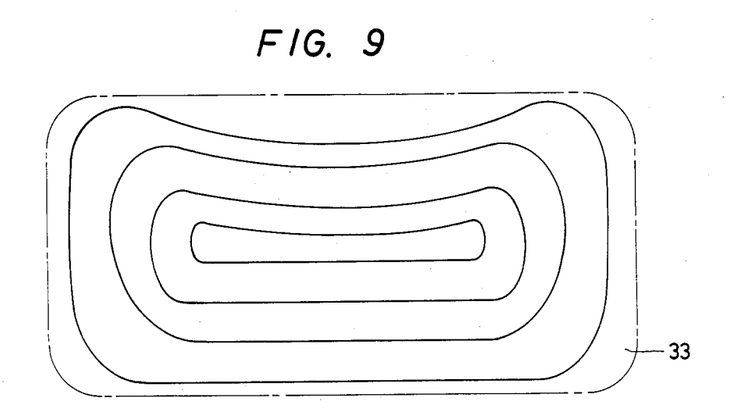
FIG. 9 shows another ejection pattern.
Figure 10:
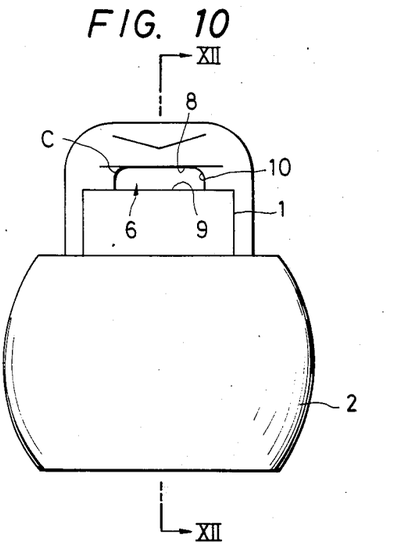
FIG. 10 shows a front view of a very-wide-angle washing water ejection nozzle unit which is still another embodiment of the present invention.
Figure 11:
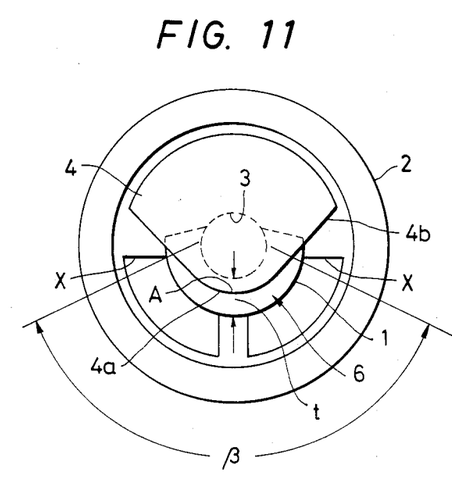
FIG. 11 shows a plan view of the nozzle unit shown in FIG. 10.
Figure 12:
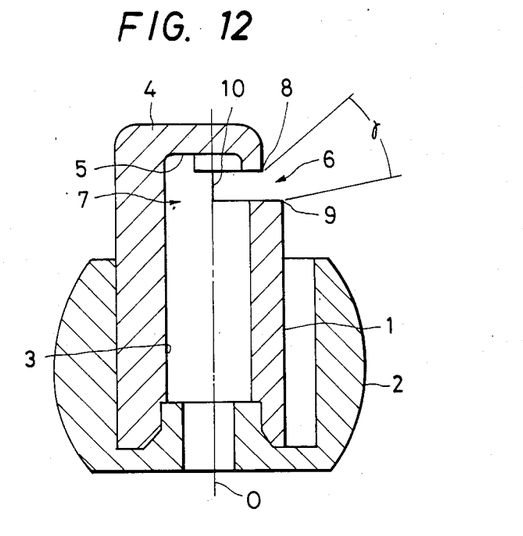
FIG. 12 shows a sectional view along a line VIII—VIII shown in FIG. 10.

FIGS. 7 and 8 shows the second embodiment in which the radius of curvature of a curved end 9 at a washing water ejection port 6 is made infinitely large so that the curved end looks rectilinear when being seen straight backward. This rectilinear lower edge differs from the first embodiment. The washing water 6 has basically the same curves A and C on the other sides as the first embodiment and is defined by a water cutting end 8 which looks curved upward from the center thereof toward both the side portions thereof when being viewed straight backward, the curved end 9 extending horizontally and opposed to the water cutting end 8, and side parts 10 which have an appropriate curvature and couple the ends 8 and 9 to each other at both the side portions thereof. As a result, an ejection pattern whose bottom line is nearly straight as shown in FIG. 9 is produced.

Figure 13:
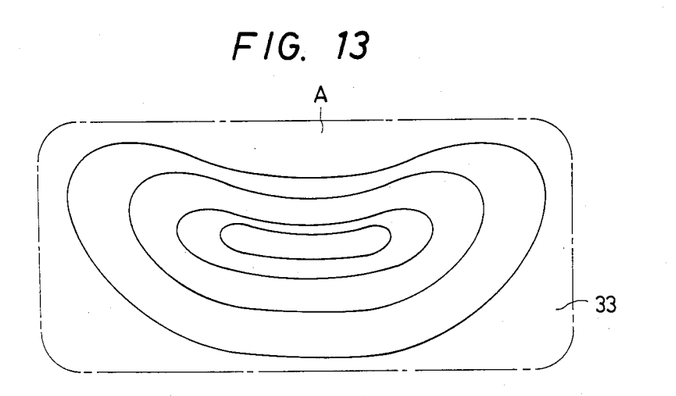
FIG. 13 shows still another ejection pattern.
Figure 14:
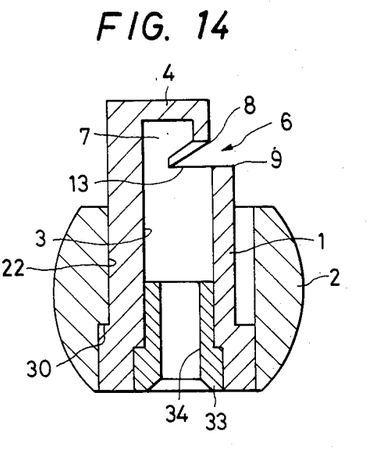
FIG. 14 shows a longitudinally sectional view of a very-wide-angle washing water ejection nozzle unit which is still another embodiment of the present invention.
Figure 15:
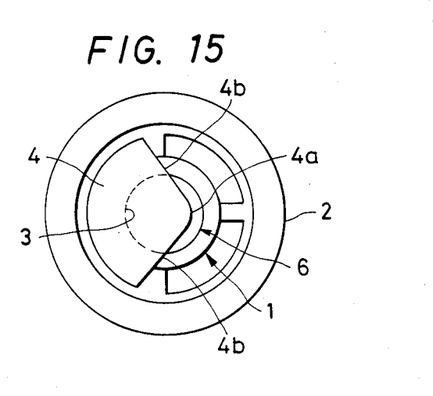
FIG. 15 shows a plan view of the nozzle unit shown in FIG. 14.
Figure 16:
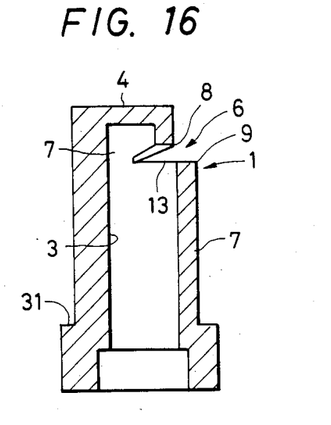
FIG. 16 shows a longitudinally sectional view of a nozzle unit member.
Figure 17:
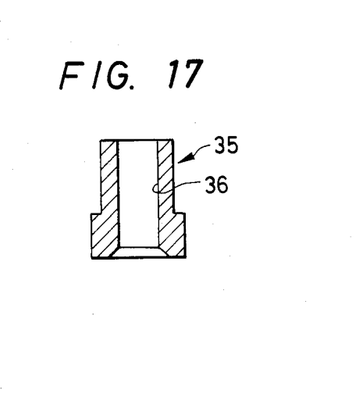
FIG. 17 shows a longitudinally sectional view of an inner cylinder.

FIGS. 10, 11, 12 and 13 show the third embodiment in which the horizontal position of the front edge of a water cutting end 8 at a washing water ejection port 6 falls within the thickness at the wall of short cylindrical member 1 having a curved end 9 at the port 6. The washing water ejection port 6 extends nearly perpendicularly to the water passage of the short cylindrical member 1. As a result, the scattering of upward washing water is suppressed by the horizontal extension of the water cutting end 8 from the water passage of the short cylindrical member 1 so that an ejection pattern whose top line A is lowered as shown in FIG. 13 is produced. The election of washing water and the density of the ejection of the drops of the washing water are controlled so that the water is ejected to the face of a very-wide-angle headlight 33 of small height and large width in accordance with the form of the face thereof to uniformly wash the face.

FIGS. 14, 15, 16 and 17 show the fourth embodiment in which a cylindrical insert 33 manufactured separately from a short cylindrical member 1 is provided instead of the inner cylinder 21 of the short cylindrical member. A spherical member 2 has a spherical peripheral fitted surface and a stepped hole 30 vertically extending to and continuous with an upper hole 22. The short cylindrical member 1, which is formed separately from the spherical member 2, has an outside step 31 located on the peripheral surface of the lower end portion of the short cylindrical member 1 and fitted in the stepped hole 30. A cylindrical insert 35 is fitted in the lower end portion of the cylindrical wall 3 of the short cylindrical member 1 so that the interior of the cylindrical insert communicates with a vortical flow generation opening 7 through a water passage port 36 of the insert. Since the inside diameter of the cylindrical insert 35 is smaller than that of the vortical flow generation opening 7, the washing water supplied into the opening produces a state of turbulent flow.

The very-wide-angle washing water ejection nozzle unit which is the fourth embodiment is constituted by the short cylindrical member 1, the spherical member 2 manufactured separately from the short cylindrical member, and the cylindrical insert 33 manufactured separately from the short cylindrical member. Therefore, a washing water ejection port 6 and the cylindrical wall 3 which affect the pattern of ejection of washing water and the density of the ejection can be optionally designed to enable the fine control of the washing water.

Since the turbulent flow generation part is made of the water cutting end 8 in each of the above described embodiments, the washing water can be changed into drops.

The washing water is almost uniformly ejected to the face of the headlight 33 so that the efficiency of washing of the face is heightened, especially when the form of the water cutting end 8 is such that the end looks curved upward from the center thereof toward both the side portions thereof when being seen straight backward.

Since each of the very-wide-angle washing water ejection nozzle units which are the embodiments for the headlight cleaners is constituted as described above, the washing water changed into the drops is widely diffused in the direction of the width of the very-wide-angle headlight to have strong washing power and is uniformly ejected to the face of the headlight to leave none of the face unwashed. As a result, not only the efficiency of the washing is enhanced but also the use of the washing water is made efficient.

What is claimed is:

1. A very-wide-angle nozzle unit for a headlight cleaner which ejects high-pressure washing water in a forward direction to the headlight of a motor vehicle to wash the headlight to recover the original efficiency of projection of light therefrom, the nozzle unit comprising:
    a short cylindrical member (1) having means for defining a vortical flow generation opening (7), said means for defining including a head (4) and a cylindrical wall (3) of said short cylindrical member, said head having an uppermost inside surface (5) facing said flow generation opening;
    a washing water ejection port (6) defined by a water cutting end (8) provided on the front of the head (4) of said short cylindrical member and having a first set curvature when being viewed in a backward direction substantially opposite to said forward direction, a top end (9) provided on a top of a front half of said short cylindrical member and corresponding to said water cutting end, and side parts (10) which have a second set curvature when being viewed in said backward direction and which couple said water cutting end and said top end to each other at both side portions thereof, said first and second set curvatures being such that the side portions of said water cutting end and top portions of said side parts form a concave shape (C) facing into said ejection port when viewed in said backward direction said ejection port communicating with said vortical flow generation opening; and
    a washing water supply section communicating with an interior of said short cylindrical member.

2. A very wide-angle nozzle unit accordingly to claim 1, further comprising:
    a nozzle unit case; and
    a spherical member supporting said short cylindrical member and fitted in said nozzle unit case.

3. A very-wide-angle nozzle unit according to claim 1, in which said water cutting end has a third set curvature (A) when viewed straight downwardly, said third set curvature being convex at least at a central portion of said water cutting end.

4. A very-wide-angle nozzle unit according to claim 1, in which said vortical flow generation opening has turbulent flow generation part disposed therein and extending downward from said water cutting end by an appropriate height from an uppermost inside surface of the head of the short cylindrical member nearly perpendicularly to said uppermost inside surface of the water cutting end, said turbulent flow generation part having a radial distance from a central axis of said short cylindrical member which is less than an inner radius of said short cylindrical member at said top end.

5. A very-wide-angle nozzle unit according to claim 1, in which said vortical flow generation opening has a turbulent flow generation part disposed therein and extending downward from said water cutting end by an appropriate height from an uppermost inside surface of the head of the short cylindrical member and nearly perpendicular to said uppermost inside surface of the water cutting end, said turbulent flow generation part having a radial distance from a central axis of said short cylindrical member which is less than an inner radius of said short cylindrical member at said top end.

6. A very-wide-angle nozzle unit according to claim 1, in which a radial distance to a front edge of said water cutting end from a central axis of said short cylindrical member is between an inner radius and an outer radius of said short cylindrical member at said top end.

7. A very-wide-angle nozzle unit according to claim 2, in which said nozzle unit has a split construction with said short cylindrical member and said spherical member being manufactured separately from each other.

8. A very-wide-angle nozzle unit according to the claim 7, in which a lower end portion of said short cylindrical member is fitted in a recess of said spherical member so that an outside circumferential surface of said lower end portion is in contact with that of said recess, an inside circumferential surface of said lower end portion is in contact with an outside circumferential surface of an inner cylinder of said spherical member and both said members are integrally coupled to each other.

9. A very-wide-angle nozzle unit according to claim 7, in which:
    said spherical member has a stepped hole extending vertically to and continuous with a recess of said spherical member; and
    said short cylindrical member has a step provided on an outside circumferential surface of a lower end portion of said short cylindrical member and is fitted in said stepped hole.

10. A very-wide-angle nozzle unit according to claim 8, wherein said inner cylinder of said spherical member comprises a cylindrical insert manufactured separately from a spherical port of the spherical member.

11. A very-wide-angle nozzle unit according to claim 2, in which said spherical member is fitted in a spherical recess of an end portion of said nozzle unit case so that a secured position of said spherical member can be adjusted.

12. A very-wide-angle nozzle unit according to claim 2, in which a diameter of the vortical flow generation opening is larger than that of a water passage hole of said spherical member.

13. A very-wide-angle nozzle unit for a headlight cleaner which ejects high-pressure washing water in a forward direction to the headlight of a motor vehicle to wash the headlight to recover the original efficiency of projection of light therefrom, the headlight having a substantially rectangular face with a large with dimension relative to a height dimension thereof, the nozzle unit comprising:

a short cylindrical member having means for defining a vortical flow generation opening, said means for defining including a head and a cylindrical wall of said short cylindrical member, said head having an uppermost inside surface facing said flow generation opening;

a washing water ejection port defined by a water cutting end provided on the front of the head of said short cylindrical member and having a first set curvature when being viewed in a backward direction substantially opposite to said forward direction, a top end provided on a top of a front half of said short cylindrical member and corresponding to said water cutting end, and side parts which have a second set curvature when viewed in said backward direction and which couple said water cutting end and said top end to each other at respective side portions thereof, said first set curvature of said water cutting end and said second set curvature of said side parts being such that the side portions of said water cutting end and top portions of said side parts form a concave shape (C) facing into said ejection port so that the ejected washing water will substantially cover the face of the headlight, said ejection port communicating with said vortical flow generation opening; and a washing water supply section communicating with an interior of said short cylindrical member.

14. A very-wide-angle nozzle according to claim 13, wherein said water cutting end has a third set curvature when viewed straight downwardly such that at least a central portion of said water cutting end has a convex shape.

* * * * *